United States Patent [19]

Iino

[11] Patent Number: 4,899,542

[45] Date of Patent: Feb. 13, 1990

[54] CONTROL DEVICE FOR A CONTINUOUSLY VARIABLE TRANSMISSION FOR MOTOR VEHICLES

[75] Inventor: Takashi Iino, Saitama, Japan

[73] Assignee: Honda Giken Kogyo Kabushiki Kaisha, Tokyo, Japan

[21] Appl. No.: 225,002

[22] Filed: Jul. 27, 1988

[30] Foreign Application Priority Data

Jul. 31, 1987 [JP] Japan ............................. 62-192346

[51] Int. Cl.⁴ ............................................. F16H 47/00
[52] U.S. Cl. ...................................... 60/487; 74/733.1
[58] Field of Search ............... 74/687, 731, 732, 733, 74/867; 60/488, 487

[56] References Cited

U.S. PATENT DOCUMENTS

| | | | |
|---|---|---|---|
| 2,928,295 | 3/1960 | Boulanger | 74/731 X |
| 3,238,723 | 3/1966 | Young | 60/53 |
| 3,455,184 | 7/1969 | Frandsen | 74/687 |
| 3,555,817 | 1/1971 | Hann | 60/53 |
| 3,704,558 | 12/1972 | Trabbic | 60/53 R |
| 3,734,225 | 5/1973 | Kobald et al. | 60/488 |
| 3,866,422 | 2/1975 | Kersten | 60/456 |
| 4,096,768 | 6/1978 | Miyao | 74/687 X |
| 4,170,153 | 10/1979 | Mizuno | 74/868 |
| 4,253,347 | 3/1981 | Mizuno | 74/862 |
| 4,261,229 | 4/1981 | Mizuno | 74/866 |
| 4,341,133 | 7/1982 | Sakamoto | 74/733 |

FOREIGN PATENT DOCUMENTS

| | | | |
|---|---|---|---|
| 0159445 | 10/1985 | European Pat. Off. | 74/687 |
| 2363762 | 6/1975 | Fed. Rep. of Germany | 74/867 |
| 2757191 | 7/1979 | Fed. Rep. of Germany | 74/687 |
| 2820025 | 11/1979 | Fed. Rep. of Germany | 74/731 |
| 56-52659 | 5/1981 | Japan . | |
| 56-95722 | 8/1981 | Japan . | |
| 56-143857 | 11/1981 | Japan . | |
| 58-191360 | 11/1983 | Japan . | |
| 61-207229 | 9/1986 | Japan . | |
| 62-237164 | 10/1987 | Japan . | |
| 7712073 | 6/1979 | Sweden | 74/867 |
| 1207829 | 1/1986 | U.S.S.R. | 74/687 |

Primary Examiner—Dirk Wright
Attorney, Agent, or Firm—Lyon & Lyon

[57] ABSTRACT

A continuously variable transmission for a motor vehicle has a closed hydraulic circuit disposed between a hydraulic pump and a hydraulic motor with the hydraulic motor being of the variable displacement type. The hydraulic pump is driven by the engine and the hydraulic motor is driven by the hydraulic pressure from the hydraulic pump for driving the road wheels. A pair of bypass passages are connected between the two oil passages of the closed hydraulic circuit between the hydraulic pump and hydraulic motor and a clutch valve is disposed in each bypass passage for adjusting the opening of that bypass passage. The opening of the bypass passages corresponding to the amount of operation of the clutch valves when the transmission receives driving forces from the road wheels during deceleration is controlled so as to be greater than the opening of the bypass passages when the transmission is driven by the engine to drive the road wheels.

15 Claims, 4 Drawing Sheets fig. 1.

CONTROL DEVICE FOR A CONTINUOUSLY VARIABLE TRANSMISSION FOR MOTOR VEHICLES

The present invention relates to a control device for a continuously variable vehicle transmission of the type employing a hydraulic pump and a hydraulic motor, and, in particular, for controlling the hydraulic clutch mechanism of such a transmission.

Japanese Laid-Open Patent Publication No. 59-95722 discloses a continuously variable transmission comprising a hydraulic pump and a hydraulic motor which are interconnected in a closed circuit, in which one or both of the hydraulic pump and the hydraulic motor are of a variable displacement type, and a bypass passage capable of providing communication between the high pressure and low pressure oil passages of the closed circuit which are disposed between the hydraulic pump and the hydraulic motor, with the opening in the bypass passage being controlled by a restrictor or clutch valve for controlling the transmission. When the motor vehicle incorporating the continuously variable transmission is stopped suddenly and then is to be started again quickly within a short time, the transmission ratio of the transmission should be increased quickly in order to obtain driving forces large enough to get the motor vehicle started, even if the transmission ratio was small before the motor vehicle was stopped suddenly. Therefore, it is necessary to change the transmission ratio from a small value to a large value during the short interval after the motor vehicle is stopped and before it is started. The present applicant previously has proposed an arrangement for meeting the above requirement by operating the transmission more quickly than normal when it is detected that the clutch is shifted into a shutoff position, as disclosed in Japanese Laid-Open Patent Publication No. 61-49202.

With the previously proposed arrangement, however, when the motor vehicle is being stopped by its idle inertia-dependent movement, since the transmission ratio is abruptly increased while the clutch is partly engaged, braking of the vehicle (so-called "engine braking") which is not intended by the driver is applied and results in an uncomfortable change in vehicle speed.

It is an object of the present invention to provide a hydraulic control device for a hydraulically operated continuously variable vehicle transmission which will solve the above problems.

In order to achieve the aforesaid object, a control device according to the present invention includes a bypass passage connected between the two oil passages of the closed hydraulic circuit which extends between the hydraulic pump and the hydraulic motor, and a clutch valve disposed in the bypass passage for adjusting the opening of the bypass passage, the arrangement being such that the opening of the bypass passage corresponding to the amount of operation of the clutch valve when the continuously variable transmission receives driving forces from the vehicle's road wheels during deceleration is controlled so as to be greater than the opening of the bypass passage with respect to the amount of operation of the clutch valve when the continuously variable transmission is driven by driving forces from the engine to drive the road wheels during acceleration.

With the control device of the foregoing construction, during stopping of the motor vehicle on its idle inertia-dependent movement, i.e., engine braking, since the opening of the bypass passage with respect to the amount of operation of the clutch valve is larger than the opening of the bypass passage when starting the motor vehicle, the engine braking is not abruptly and intensively applied and the motor vehicle can smoothly be stopped even if the transmission ratio is suddenly increased while the clutch is in partly engaged condition.

A preferred embodiment of the present invention will be described hereinbelow with reference to the drawings, wherein.

Figure 1:
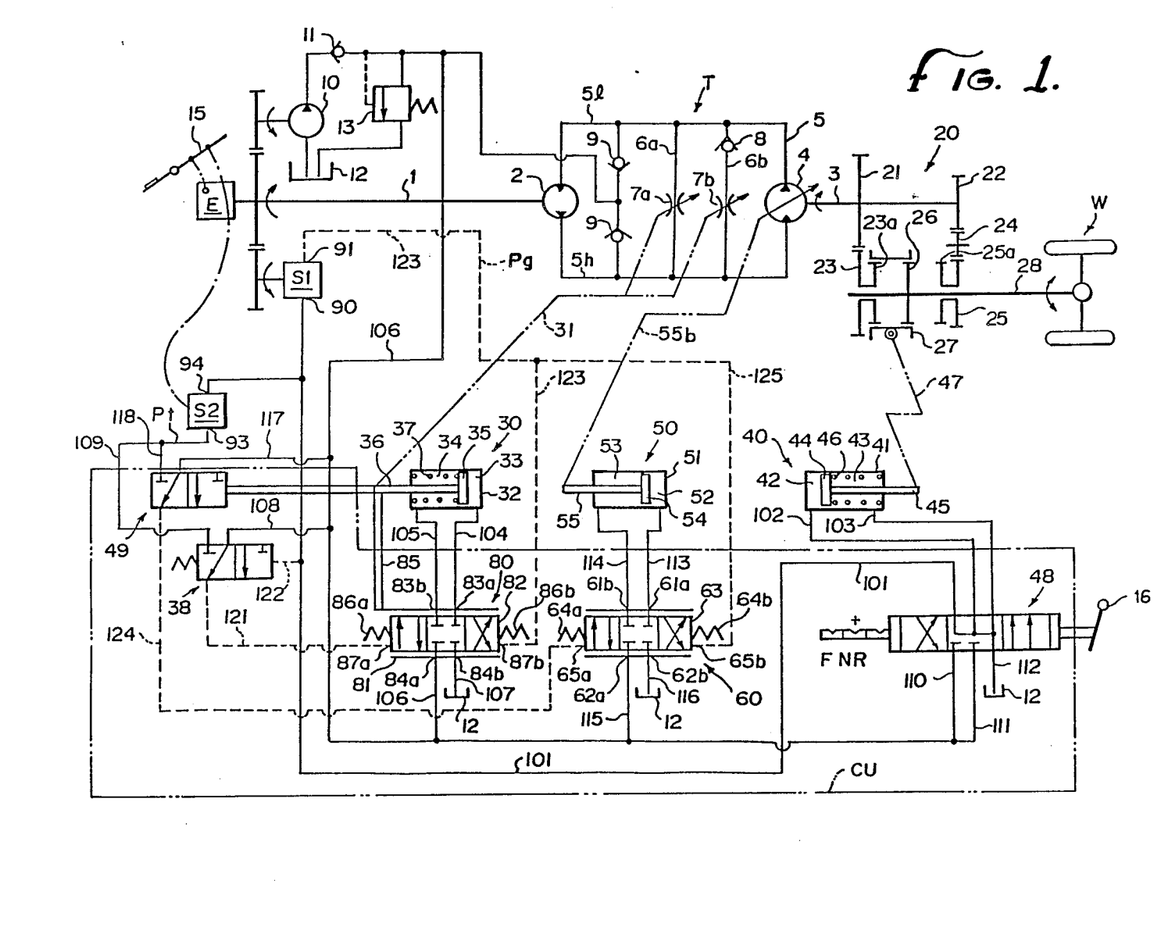
FIG. 1 is a schematic diagram of the hydraulic circuit of a continuous variable transmission of the present invention.

FIG. 1 shows a hydraulic circuit of a hydraulically operated continuously variable transmission T according to the present invention, incorporated in a motor vehicle. The continuously variable transmission T has a hydraulic pump 2 of the fixed displacement type which is driven by an engine E, and a hydraulic motor 4 of the variable displacement type having a drive shaft 3 for driving the road wheels W of the vehicle through a forward/reverse mode selector device 20. The hydraulic pump 2 and the hydraulic motor 4 are connected in a closed hydraulic circuit 5 having a first oil passage 5h communicating between the outlet port of the pump 2 and the inlet port of the motor 4 and a second oil passage 5l communicating between the inlet port of the pump 2 and the outlet port of the motor 4. Between the two oil passages 5h and 5l, there are two bypass passages 6a, 6b having respective first and second clutch valves 7a, 7b comprising variable restrictors serving as clutches. The bypass passage 6b with the second clutch valve 7b has a deceleration check valve 8 for allowing oil to flow only from the second oil passage 5l to the first oil passage 5h.

A charging pump 10 that is actuatable by the engine E has an outlet port connected to the oil passages 5h, 5l through check valve 11 and two check valves 9 and 9. Working oil pumped from an oil sump 12 and regulated in pressure by a relief valve 13 is supplied to the closed hydraulic circuit 5 in order to compensate for any oil shortage in the closed circuit 5.

An output shaft 28 coupled to the road wheels W extends parallel to the drive shaft 3 of the hydraulic motor 4, with the forward/reverse mode selector device 20 disposed between the shafts 3, 28. The forward/reverse mode selector device 20 comprises first and second driver gears 21, 22 spaced axially from each other, a first driven gear 23 rotatably supported on the output shaft 28 and meshing with the first driver gear 21, a second driver gear 25 meshing with the second driver gear 22 through an intermediate gear 24 and rotatably supported on the output shaft 28, a clutch hob 26 fixed to the output shaft 28 between the first and second driven gears 23, 25, and a sleeve 27 axially slidable for selectively connecting clutch gears 23a, 25a on sides of the driven gears 23, 25 to the clutch hub 26. When the sleeve 27 is slid to the left in FIG. 1 to connect the clutch gear 23a of the first driven gear 23 to the clutch hub 26, as shown, the output shaft 28 is rotated in a direction opposite to the direction of rotation of the drive shaft 3 for rotating the road wheels W in a forward direction in response to operation of the continuously variable transmission T. When the sleeve 27 is slid to the right in FIG. 1 to connect the clutch gear 25a of the second driven gear 23 to the clutch hub 26, the output shaft 28 is rotated in the same direction as the direction of rotation of the drive shaft 3 for rotating the road wheels W in a reverse direction.

The clutch valves 7a, 7b are actuated by a servocylinder 30, whereas the forward/reverse mode selector device 20 is operated by a hydraulic cylinder 40. The displacement of the hydraulic motor 4 is controlled by a hydraulic cylinder 50. The operation of these cylinders 30, 40, 50 is controlled by a control unit CU to which there are connected a first detector means S1 for detecting the speed of rotation of the engine E as an indication of the power output of the engine E and a second detector means S2 for detecting the opening of the throttle valve of the engine E as an indication of the driver's intention of acceleration and deceleration. The control unit CU controls the servocylinder 30 and the hydraulic cylinder 40 in response to input signals from the first and second detector means S1, S2 and operation of a manual selector lever 16, and also controls the hydraulic cylinder 50 in response to input signals from the detector means S1, S2, operation of the manual selector lever 16, and operating conditions of the clutch valves 7a, 7b.

The first detector means S1 comprises, for example, a hydraulic governor responsive to the rotation of the input shaft 1, and has an input port 90 connected to an oil passage 101 which can be supplied with a hydraulic pressure Pl discharged from the charging pump 10. The first detector means S1 also has an output port 91 for issuing a governor pressure Pg proportional to the speed of rotation of the engine E. The governor pressure Pg is selected to be lower than the pressure Pl discharged from the charging pump 10 (Pg<Pl).

The second detector means S2 comprises, for example, a throttle valve opening/hydraulic pressure converter having an output port 93 for issuing a throttle pressure Pt proportional to operation of a throttle valve opening/closing device 15. The second detector means S2 has an input port 94 connected to the oil passage 101. The throttle pressure Pt is selected to be lower than the pump pressure Pl (Pt<Pl).

Figure 2A:
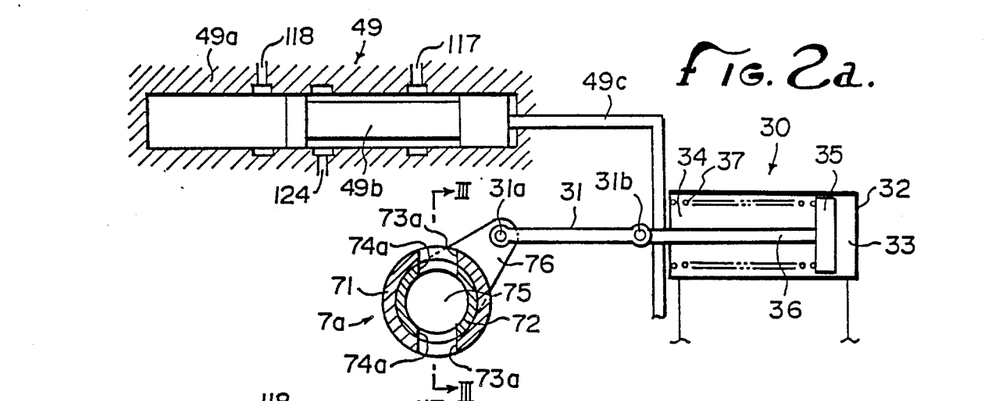
FIGS. 2a, 2b and 2c are cross-sectional views showing the manner in which a clutch valve, a servocylinder, and a directional control valve are operated in mutually interlinked relation.
Figure 2B:
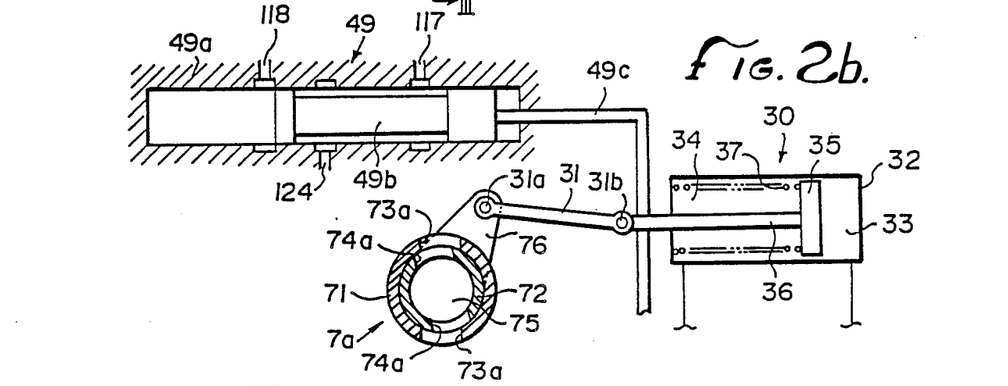
Figure 2C:
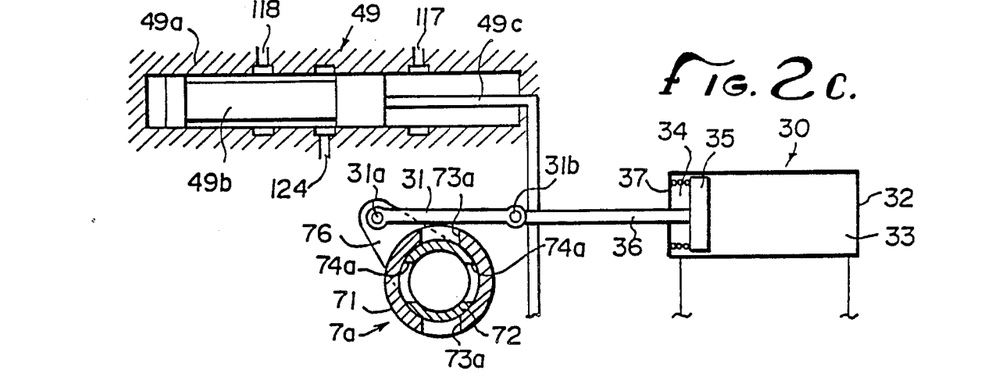
Figure 3:
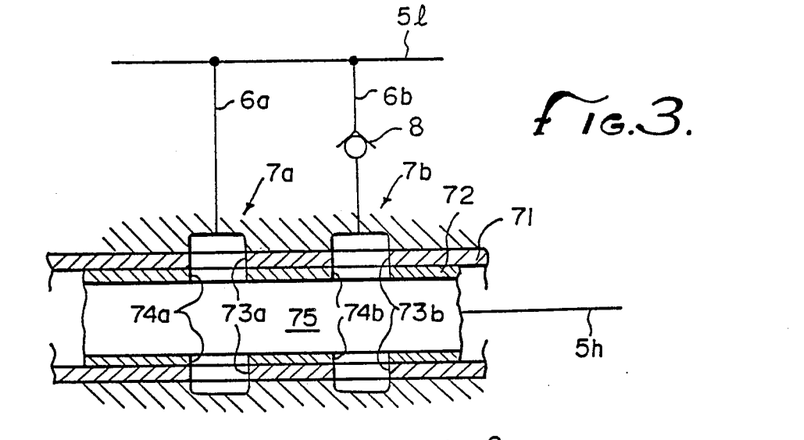
FIG. 3 is a cross-sectional view of the clutch valve.

The clutch valves 7a, 7b may be identical and, as shown in FIGS. 2a through 2c, the clutch valves 7a, 7b are formed by a cylindrical fixed member 71 and a cylindrical rotatable member 72 rotatably fitted in the fixed member 71. The rotatable member 72 defines therein a valve chamber 75 which is held in communication with the first oil passage 5h at all times. As shown in FIG. 3 which is a cross section taken along line III—III of FIG. 2(a), the rotatable member 72 has a pair of axially spaced valve holes 74a, 74b defined in a side wall thereof. The fixed member 71 has a pair of bypass holes 73a, 73b defined in a side wall thereof in corresponding relation to the valve holes 74a, 74b, respectively. The holes 73a, 74a constitute the clutch valve 7a, whereas the holes 73b, 74b constitute the clutch valve 7b. The bypass hole 73a is in communication with the second oil passage 5l through the bypass passage 6a at all times. The bypass hole 73b is held in communication with the second oil passage 5l via the bypass passage 6b which has the deceleration check valve 8.

The valve holes 74a, 74b and the bypass holes 73a, 73b are defined such that the holes 73a, 74a register with each other and the holes 73b, 74b register with each other when the rotatable member 72 is in a prescribed angular position. In this prescribed angular position, the first and second oil passages 5h, 5l communicate with each other bidirectionally through the first clutch valve 7a, and unidirectionally through the second clutch valve 7b with the deceleration check valve 8 allowing only an oil flow from the second oil passage 5l to the first oil passage 5h.

The rotatable member 72 has a radially outwardly projecting arm 76 which is coupled to the servocylinder 30 through a link 31. The link 31 has an end connected to the arm 76 through a pin 31a parallel to the axis of the rotatable member 72, and the other end to the servocylinder 30 through a pin 31b parallel to the pin 31a.

In response to operation of the servocylinder 30, the rotatable member 72 is angularly moved in an angular range of substantially 90° by the link 31 for continuously varying the opening of the bypass passages 6a, 6b from a fully open condition to a fully closed condition. The servocylinder 30 comprises a cylinder 32, a piston 35 slidably disposed in the cylinder 32 and dividing the interior of the cylinder 32 into a head chamber 33 and a rod chamber 34, a piston rod 36 integrally joined to the piston 35 and extending hermetically and movably through the end wall of the cylinder 32 facing the rod chamber 34, and a spring 37 disposed in the rod chamber 34 for normally urging the piston 36 into the head chamber 33.

The link 31 is coupled to the distal end of the piston rod 36 through the pin 31b. When the piston 36 is moved a maximum stroke to the right, the clutch valves 7a, 7b are fully opened to cut off power transmission through the transmission T. When the piston 35 is moved to the left against the resiliency of the spring 37, the valve holes 74a, 74b are slightly shifted in position off the bypass holes 73a, 73b to reduce the opening of the bypass passages 6a, 6b, resulting in a partly engaged clutch condition, as shown in FIG. 2b. By moving the piston 35 a maximum stroke to the left against the force of the spring 37, the valve holes 74a, 74b are fully shifted out of registry with the bypass holes 73a, 73b to close the clutch valves 7a, 7b, whereupon power can be fully transmitted by the transmission T, as shown in FIG. 2c.

Figure 6:
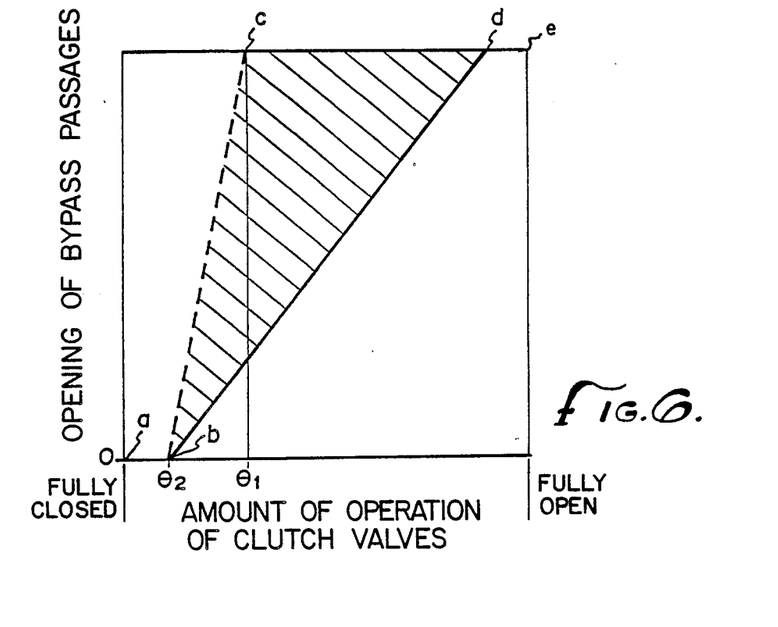
FIG. 6 is a graph illustrating the relationship between the amount of operation of the clutch valve and the opening of bypass passage.

The relationship between the amount of rotation of the rotatable member 72 caused by the operation of the servocylinder 30, i.e., the amount of operation of the clutch valves 7a, 7b, and the opening of the bypass passages 6a, 6b will be described with reference to FIG. 6. When the hydraulic pressure in the first oil passage 5h is higher than the hydraulic pressure in the second oil passage 5l to cause working oil to flow from the first oil passage 5h to the second oil passage 5l, the bypass passage 6b remains closed by the check valve 8 even if the second clutch valve 7b is open, and hence only the opening of the first clutch valve 7a may be considered. If the clutch valves 7a, 7b are angularly shifted from the fully closed position (FIG. 2c) to the fully open position (FIG. 2a), then the opening of the bypass passages 6a, 6b with respect to the amount of operation of the clutch valves 7a, 7b varies along a→b→d→e as indicated by the solid line.

When the hydraulic pressure in the second oil passage 5l is higher than the hydraulic pressure in the first oil passage 5h, as during deceleration of the vehicle, to cause working oil to flow from the second oil passage 5l to the first oil passage 5h, the bypass passage 6b is also opened. Upon shifting of the clutch valves 7a, 7b from the fully closed position to the fully open position, the opening of the bypass passages 6a, 6b vary along a→b→c→e as indicated by the dotted line. It follows that the opening of the second clutch valve 7b is selected to be of a range represented by the hatched area in FIG. 6.

The hydraulic cylinder 40 comprises a cylinder 41, a piston 44 slidably disposed in the cylinder 41 and dividing the interior space of the cylinder 41 into a head chamber 42 and a rod chamber 43, a piston rod 45 integrally joined to the piston 44 and extending hermetically and movably through the end wall of the cylinder 41 facing the rod chamber 43, and a spring 46 disposed in the chamber 43 for normally urging the piston 44 into the head chamber 42.

A connector 47 is fixed to the distal end of the piston rod 45 and also to the sleeve 27. In response to operation of the piston 44 and the piston rod 45, therefore, the sleeve 27 is moved to operate the forward/reverse mode selector device 20. More specifically, when the piston 44 and the piston rod 45 are moved to the lefthand limit position, a forward gear train is established in the forward/reverse mode selector device 20. When the piston 44 and the piston rod 45 are moved to the righthand limit position, a reverse gear train is established in the forward/reverse mode selector device 20. The head chamber 42 is connected to an oil passage 102, whereas the rod chamber 43 is connected to an oil passage 103.

Figure 4:
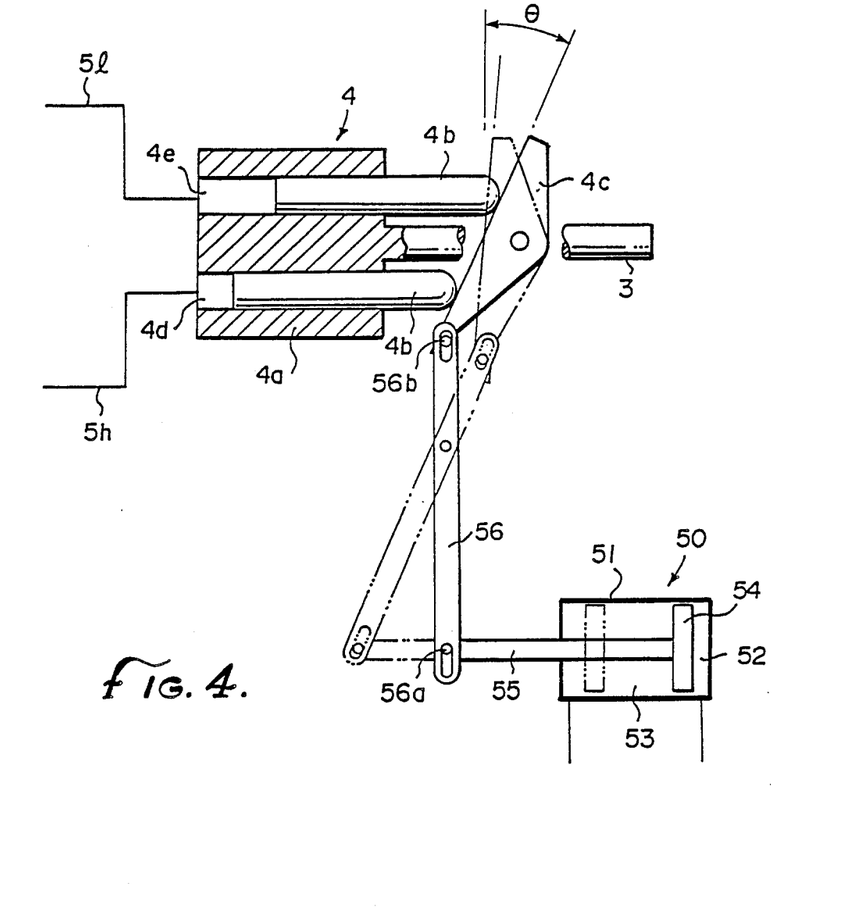
FIG. 4 is a schematic view of a hydraulic motor and a hydraulic cylinder for controlling the operation of the hydraulic motor.

As shown in FIG. 4, the hydraulic motor 4 comprises a variable displacement axial piston motor comprising an angular array of pistons 4b slidably fitted in a cylinder block 4a coupled to the drive shaft 3 and disposed around the axis of rotation of the drive shaft 3, and a swash plate 4c inclined at a variable angle $\theta$ for controlling the reciprocating stroke of the pistons 4b. Cylinder chambers 4d defined in the cylinder block 4a and housing those pistons 4b which are on an expansion stroke are held in communication with the higher-pressure oil passage 5h, and cylinder chambers 4e defined in the cylinder block 4a and housing those pistons 4b which are on a contraction stroke are held in communication with the lower-pressure oil passage 5l.

In the hydraulic motor 4 of the above structure, as is known in the art, higher-pressure oil discharged from the fixed displacement hydraulic pump 2 is forced into the cylinder chambers 4d, and lower-pressure oil is discharged from the cylinder chamber 4e and returns to the hydraulic pump 2, during which time the cylinder block 4a and the drive shaft 3 are rotated about their own axes under a reactive torque which the pistons 4b on the expansion stroke receive from the swash plate 4c.

The displacement of the hydraulic motor 4 is determined by the stroke of the pistons 4b. Therefore, the transmission ratio R of the transmission T can be continuously controlled from a maximum value to a maximum value by varying the angle $\theta$ of inclination of the swash plate 4c from a maximum indicated by the solid line to a minimum indicated by the two-dot-and-dash line. The transmission ratio R is expressed by the following equation:

$$R = \frac{\text{Input shaft speed}}{\text{Output shaft speed}} = 1 + \frac{\text{Motor Displacement}}{\text{Pump Displacement}}$$

The swash plate 4c has one end connected to one end of a swing link 56 by a pin 56b, and the other end of the swing link 56 is connected to the hydraulic cylinder 50 by a pin 56a parallel to the pin 56b.

The hydraulic cylinder 50 comprises a cylinder 51, a piston 54 slidably disposed in the cylinder 51 and dividing the interior space thereof into a head chamber 52 and a rod chamber 53, and a piston rod 55 integrally joined to the piston 54 and extending hermetically and movably through the end wall of the cylinder 51 facing the rod chamber 53. The other end of the swing link 56 is connected to the distal end of the piston rod 55 by the pin 56a. When the piston 54 is moved a maximum stroke to the right (as shown in solid lines), the angle $\theta$ of the swash plate 4c is maximized and so are the displacement of the hydraulic motor 4 and the transmission ratio R. When the piston 54 is moved a maximum stroke to the left (as indicated by the two-dot-and-dash line), the angle $\theta$ of the swash plate 4c is minimized and so are the displacement of the hydraulic motor 4 and the transmission ratio R.

Referring back to FIG. 1, the control unit CU has a pair of pilot valves 80, 60, a pair of directional control valves 38, 49, and a manual valve 48.

The pilot valve 80 comprises a sleeve 81 disclosed between oil passages 104, 105 communicating respectively with the head chamber 33 and the rod chamber 34 of the servocylinder 30, an oil supply passage 106 communicating with the outlet port of the charging pump 10, an oil release passage 107 communicating with the oil sump 12, and a spool 82 relatively movably disposed in the sleeve 81. The pilot valve 80 has ports 83a, 83b communicating with the oil passages 104, 105, respectively, and ports 84a, 84b communicating with the oil supply passage 106 and the oil release passage 107, respectively. The sleeve 81 is connected to the piston rod 36 of the servocylinder 30 through a link 85 so that movement of the servocylinder 30 can be fed back to the pilot valve 80.

The spool 82 is movable relative to the sleeve 81 between three selectable positions, i.e., a lefthand position in which the spool 82 communicates the ports 83b, 84a and the ports 83a, 84b, a neutral position in which the spool 82 cuts off communication between the ports 83a, 83b and the ports 84a, 84b, and a righthand position in which the spool 82 communicates the ports 83a, 84a and the ports 83b, 84b. A spring 86a is held against the lefthand end of the spool 82 for normally urging the spool 82 to move in a rightward direction, and another spring 86b is held against the righthand end of the spool 82 for normally urging the spool 82 to move in a leftward direction. The pilot valve 80 also has a switching port 87a for applying a hydraulic pressure to the lefthand end of the spool 82 and a switching port 87b for applying a hydraulic pressure to the righthand end of the spool 82.

A force F1 acting on the lefthand end of the spool 82 of the pilot valve 80 is the sum of a biasing force F11 of the spring 86a and a hydraulic force F12 acting on the lefthand end of the spool 82 (F1=F11+F12), whereas a force F2 acting on the righthand end of the spool 82 is the sum of a biasing force F21 of the spring 86b and a hydraulic force F22 acting or the righthand end of the spool 82 (F2=F21+F22). The spool 82 is moved in response to a change in the equilibrium condition of the forces F1, F2. For example, if F1<F2, the spool 82 is moved to the left to reach the righthand position for introducing the hydraulic pressure Pl discharged from the charging pump 10 into the head chamber 33 of the servocylinder 30, and the hydraulic pressure in the rod chamber 34 is released into the oil sump 12. The piston 35 and the piston rod 36 are now moved to the left thereby operating the clutch valves 7a, 7b in the closing direction.

Upon movement of the spool 82 to the left, the biasing force F11 of the spring 86a is increased, and the biasing force F21 of the spring 86b is reduced. When F1=F2, the spool 82 is stopped. The sleeve 81 is moved to the left by the link 85 in response to the movement of the piston rod 36 to the left. Therefore, when the sleeve 81 and the spool 82 reach the neutral position, the flow of working oil between the ports 83a, 84a, 83b, 84b is cut off, and the leftward movement of the piston rod 36 is stopped and so is the operation of the clutch valves 7a, 7b. The sleeve 81 is also stopped in unison with the piston rod 36.

When F1>F2, the spool 82 is moved to the right into the lefthand position with respect to the sleeve 81. The hydraulic pressure Pl discharged from the charging pump 10 is introduced into the rod chamber 34 of the servocylinder 30, and the hydraulic pressure in the head chamber 33 is released into the oil sump 12. Therefore, the piston 35 and the piston rod 36 are moved to the right, whereby the clutch valves 7a, 7b are operated in the opening direction.

With the spool 82 moved to the right, the biasing force F21 of the spring 86b is increased and the biasing force F11 of the spring 86a is reduced until F1=F2 whereupon the rightward movement of the spool 82 is stopped. At this time, the sleeve 81 is also moved to the right with the rightward movement of the piston rod 36. When the sleeve 81 and the spool 82 are relatively in the neutral position, the oil supply into the rod chamber 34 is stopped to stop the rightward movement of the piston rod 36, whereupon the operation of the clutch valves 7a, 7b is also stopped. The rightward movement of the sleeve 81 is also stopped in unison with the piston rod 36.

The aforesaid mechanism is a general servomechanism by which the piston rod 36 can be moved in response to movement of the spool 82 for adjusting the opening of the clutch valves 7a, 7b, i.e., the opening of the bypass passages 6a, 6b.

The directional control valve 38 comprises a three-port two-position directional control valve interposed between an oil passage 108 connected to the outlet port of the charging pump 10, an oil passage 109 connected to the output port 93 of the second detector means S2, and a pilot oil passage 121 connected to the switching port 87a of the pilot valve 80. The directional control valve 38 is movable between a lefthand position in which it communicates the oil passage 108 with the pilot oil passage 121 and a righthand position in which it communicates the oil passage 109 with the pilot oil passage 121. The directional control valve 38 assumes the righthand position when the hydraulic pressure discharged from the charging pump 10 is introduced into a pilot oil passage 122 branched from the oil passage 101 and coupled to the righthand end of the valve 38.

The switching port 87b of the pilot valve 80 is in communication with the output port 91 of the first detector means S1 through a pilot oil passage 123.

When the hydraulic pressure Pl discharged from the charging pump 10 is supplied to the oil passage 101, the hydraulic pressure Pl is also introduced into the pilot oil passage 122 thereby to shift the directional control valve 38 into the righthand position, whereupon the throttle pressure Pt is applied to the switching port 87a of the pilot valve 80. The other switching port 87b is supplied with the governor pressure Pg from the first detector means S1. The pilot valve 80 is operated to open or close the clutch valves 7a, 7b until the forces F1, F2 including the hydraulic forces F12, F22 are balanced or put in equilibrium.

When the pump pressure Pl is not supplied to the oil passage 101, i.e., when the hydraulic pressure in the oil passage 101 is zero, the directional control valve 38 takes the lefthand position to apply the pump pressure Pl to the switching port 87a of the pilot valve 80. Since the hydraulic pressure in the input port 90 is zero, the governor pressure Pg from the first detector means S1 is also zero, and no hydraulic pressure acts on the righthand end of the spool 82. Inasmuch as the pilot valve 80 is arranged such that the force F1 tending to move the spool 82 to the right is greater than the force F2 tending to move the spool 82 to the left (F1>F2) at this time, the spool 82 is moved to the righthand limit position for reliably fully opening the clutch valves 7a, 7b.

The manual valve 48 comprises a six-port three-position directional control valve interposed between the oil passages 101, 102, 103, a pair of oil passages 110, 111 communicating with the oil supply passage 106, and an oil release passage 112 communicating with the oil sump 12. The manual valve 48 can manually be moved selectively between three positions, i.e., a forward position, a neutral position, and a reverse position. More specifically, in response to operation of the manual selector lever 16, the manual valve 48 can selectively assume the forward position F (lefthand position), the neutral position N, and the reverse position R.

In the forward position F, with the valve spool shifted to the right as viewed in FIG. 1, the manual valve 48 provides communication between the oil passages 110, 101, the oil passages 111, 103, and the oil passage 102 and the oil release passage 112. In the neutral position N (as shown), all of the oil passages 101, 102, 103 communicate with the oil release passage 112. In the reverse position R, the manual valve 48 provides communication between the oil passages 110, 101, the oil passages 111, 102, and the oil passage 103 and the oil release passage 112.

The pilot valve 60 comprises a four-port restriction directional control valve interposed between an oil passage 113 communicating with the head chamber 52 of the hydraulic cylinder 50, an oil passage 114 communicating with the rod chamber 53 thereof, an oil passage 115 branched from the oil supply passage 106 for introducing the hydraulic pressure Pl from the charging pump 10, and an oil release passage 116 connected to the oil pump 12.

The pilot valve 60 has ports 61a, 61b communicating respectively with the oil passages 113, 114, ports 62a, 62b communicating respectively with the oil passage 115 and the oil release passage 116, and a spool 63. The spool 63 is selectively movable between a lefthand position in which the spool 63 communicates the ports 61a, 62b and the ports 61b, 62a, a neutral position in which communication between all of the ports 61a, 61b, 62a, 62b is cut off, and a righthand position in which the spool 63 communicates the ports 61a, 62a and the ports 61b, 62b, while having an intermediate position in which the restriction of the pilot valve 60 is continuously variable. A spring 64a is held against the lefthand end of the spool 63 for normally urging the spool 63 to the right, and a spring 64b is held against the righthand end of the spool 63 for normally urging the spool 63 to the left. The pilot valve 60 also has a switching port 65a for applying a hydraulic pressure to the lefthand end of the spool 63, and a switching port 65b for applying a hydraulic pressure to the righthand end of the spool 63. The switching port 65a is connected to a pilot oil passage 124, whereas the other switching port 65b is connected to a pilot oil passage 125 branched from the pilot oil passage 123 which is coupled to the output port 91 of the first detector means S1.

A force F3 acting on the lefthand end of the spool 63 of the pilot valve 60 is the sum of a biasing force F31 of the spring 64a and a hydraulic force F32 acting on the lefthand end of the spool 63 (F3=F31+F32), whereas a force F4 acting on the righthand end of the spool 63 is the sum of a biasing force F41 of the spring 64b and a hydraulic force F42 acting on the righthand end of the spool 63 (F4=F41+F42). The spool 63 is moved in response to a change in the equilibrium condition of the forces F3, F4.

As illustrated in FIGS. 1 and 2a through 2c, the directional control valve 49 is a three-port two-position directional control valve interposed between an oil passage 117 branched from the oil passage 106, an oil passage 118 connected to the output port 93 of the second detector means S2, and the pilot oil passage 124 connected to the switching port 65a of the pilot valve 60. The directional control valve 49 is selectively movable between a lefthand position in which the oil passage 117 communicates with the pilot oil passage 124, i.e., a spool 49b is moved to the right in a sleeve 49a, and a righthand position in which the oil passage 118 communicates with the pilot oil passage 124, i.e., the spool 49b is moved to the left in the sleeve 49a.

The spool 49b is connected to one end of a link 49c the other end of which is coupled to the piston rod 36 of the servocylinder 30. When the servocylinder 30 is operated to open the clutch valves 7a, 7b for cutting off power to the transmission, the directional control valve 49 is shifted to the lefthand position to communicate the oil passage 117 with the pilot oil passage 124. The directional control valve 49 continues to be in the lefthand position until the clutch valves 7a, 7b are moved in the closing direction to a certain opening which is smaller than the opening under the partly engaged clutch condition. When the servocylinder 30 is operated to close the clutch valves 7a, 7b to an opening smaller than the aforesaid certain opening, the directional control valve 49 is shifted into the righthand position in which the oil passage 118 communicates with the pilot oil passage 124. Thus, under the power transmitting condition in which the opening of the clutch valves 7a, 7b is smaller than the foregoing certain opening, the throttle pressure Pt from the second detector means S2 is applied to the switching port 65a of the pilot valve 60. Under the power cutoff condition in which the opening of the clutch valves 7a, 7b exceeds the certain opening, the hydraulic pressure Pl from the charging pump 10 acts on the switching port 65a.

When F3<F4 on the pilot valve 60, the spool 63 is moved to the left to increase the biasing force F31 of the spring 64a and reduce the biasing force F41 of the spring 64b. When F3=F4, the leftward movement of the spool 63 is stopped. At this time, working oil in an amount commensurate with the opening between the ports 61a, 62a and between the ports 61b, 62b is introduced into the head chamber 52 of the hydraulic cylinder 50, and discharged from the rod chamber 53 thereof, for thereby moving the piston 54 and the piston rod 55 to the left. When F3>F4, the spool 63 is moved to the right to increase the biasing force F41 of the spring 64b and reduce the biasing force F31 of the spring 64a. When the condition F3=F4 is reached, the rightward movement of the spool 63 ceases. At this time, working oil in an amount commensurate with the opening between the ports 61a, 62b and between the ports 61b, 62a is discharged from the head chamber 52 of the hydraulic cylinder 50, and introduced into the rod chamber 53 thereof, for thereby moving the piston 54 and the piston rod 55 to the right. The pressure distribution between the head chamber 52 and the rod chamber 53 is determined by the degree of restriction by the pilot valve 60. The piston 54 and the piston rod 55 is operated at a speed dependent on the pressure difference between the head chamber 52 and the rod chamber 53 for thereby varying the displacement of the hydraulic motor 4.

Assuming that the areas of the opposite ends of the spool 63 of the pilot valve 60 are the same, the following equations are established:

$$F32 = Pt \times S \text{ or } F32 = Pl \times S,$$

$$F42 = Pg \times S.$$

Since Pl>Pt, Pl>Pg, the following inequalities are established at all times:

$$Pl \times S > Pt \times S$$

$$Pl \times S > Pg \times S.$$

Operation of this embodiment will be described below. Before the engine E is started, the charging pump 10 is at rest, and the hydraulic pressure Pl discharged thereby is zero. Therefore, the governor pressure Pg and the throttle pressure Pt are also zero. At this time, the position of the spool 82 in the pilot valve 80 is determined by the set loads or biases of the springs 86a, 86b, which are determined such that the spool 82 is moved in the direction to open the clutch valves 7a, 7b, into the lefthand position. The piston 38 and the piston rod 36 of the servocylinder 30 are moved to the right under the bias of the spring 37 into the position to open the clutch valves 7a, 7b, and the sleeve 81 of the pilot valve 80 is also moved to the right through the link 85.

Now, it is assumed that the manual valve 48 is in the neutral position N after the engine E has started. The oil passages 101, 102, 103 communicate with the oil sump 12, and hence the hydraulic pressure in the head chamber 42 and the rod chamber 43 of the hydraulic cylinder 40 is released. Therefore, the piston 44 of the hydraulic cylinder 40 is pushed to the lefthand limit position under the resiliency of the spring 46, and the sleeve 27 is also in the lefthand limit position. The forward/reverse selector mode device 20 is thus in the forward position. Since the hydraulic pressure in the oil passage 101 is zero, the directional control valve 38 is in the lefthand position.

The hydrulic force F12 on the pilot valve 80 is of a valve corresponding to the pump pressure Pl, the hydraulic force F22 is zero since Pg=0 with the oil passage 101 being connected to the oil sump 12, and F1>F2 at all times. Therefore, the spool 82 is in the lefthand position. The piston 35 of the servocylinder 30 is also stopped in the righthand limit position, so that the clutch valves 7a, 7b are fully open.

In this condition, because working oil discharged from the hydraulic pump 2 dependent on the speed of rotation of the engine E flows through the bypass passage 6a, the hydraulic motor 4 is not actuated, and hence no power is transmitted to the output shaft 28, so that the road wheels W remain at rest. When the engine speed is increased by depressing the accelerator pedal of the throttle valve opening/closing device 15, at this time, the spool 82 of the pilot valve 80 is not moved to the left because F22=0 (Pg=0). Thus, the clutch valves 7a, 7b remain fully open irrespective of the throttle valve opening and the speed of rotation of the engine E.

Since the clutch valves 7a, 7b are fully open, the directional control valve 49 is in the lefthand position, and F3=F31+F32, F4=F41 on the pilot valve 60 because the governor pressure Pg from the first detector means S1 is 0. The set loads of the springs 64a, 64b are determined so that F3>F4 under this condition. The spool 63 is thus in the lefthand position to introduce the hydraulic pressure Pl discharged from the charging pump 10 into the rod chamber 53 of the hydraulic cylinder 50 and also to release the hydraulic pressure from the head chamber 52 to the oil sump 12. Consequently, the piston 54 and the piston rod 55 of the hydraulic cylinder 50 are moved to the righthand limit position to maximize the angle $\theta$ of the swash plate 4c of the hydraulic motor 4. The transmission ratio R in the neutral position N is thus at maximum.

When the manual selector lever 16 is operated to shift the manual valve 48 from the neutral position N to the forward position F, whereupon the manual valve 48 provides communication between the oil passages 110, 101, the oil passages 111, 103, and the oil passage 102 and the oil release passage 112. Therefore, the pump pressure Pl is supplied to the rod chamber 43 of the hydraulic cylinder 40, and the head chamber 42 remains released, with the piston 44 remaining pushed to the lefthand limit position. Therefore, the forward/reverse mode selector device 20 remains in the forward position. Also, the oil passage 101 is supplied with the pump pressure Pl.

When the pump pressure Pl is supplied from the oil passage 101 to the pilot oil passage 122, the directional control valve 38 is shifted to the righthand position for thereby supplying the throttle pressure Pt from the second detector means S2 to the switching port 87a of the pilot valve 80. The governor pressure Pg from the first detector means S1 is supplied via the pilot oil passage 123 to the switching port 87b of the pilot valve 80. Therefore, the pilot valve 80 is operated to open or close the clutch valves 7a, 7b until equilibrium is reached between the throttle pressure Pt and the governor pressure Pg.

If the above operation is carried out in an engine idling condition in which the motor vehicle is at rest and the throttle valve opening/closing device 15 is not operated, then the first detector means S1 produces the governor pressure Pg corresponding to the idling speed of the engine E, and the second detector means S2 generates the throttle pressure Pt corresponding to the throttle valve opening of zero. By arranging the pilot valve 80 such that the condition F1=F2 is reached when the spool 81 thereof is moved a predetermined distance from the righthand limit position, the piston rod 36 of the servocylinder 30 is stopped after it has moved to the left by the predetermined distance. The clutch valves 7a, 7b are now in a partly engaged clutch condition.

In the engine idling condition, the governor pressure Pg corresponding to the idling speed acts on the switching port 65b of the pilot valve 60, whereas the sump pressure Pl acts on the the switching port 65a thereof. The spool 63 then goes to the lefthand position by determining the biasing forces F31, F41 of the springs 64a, 64b so that F3>F4 at all times. Therefore, the hydraulic pressure in the head chamber 52 of the hydraulic cylinder 50 is released into the oil sump 12, and the pump pressure Pl acts in the rod chamber 53. The piston 54 and the piston rod 55 remain shifted to the righthand limit position, the angle $\theta$ of the swash plate 4c is at maximum, and the transmission ratio R remains maximum.

When the accelerator pedal is depressed to get the vehicle started from the engine idling condition, the throttle valve is opened to increase the throttle pressure Pt, whereupon the force F12 on the pilot valve 80 is increased, and as a result the force F1 becomes greater. Since the speed of rotation of the engine E goes higher, the output or governor pressure Pg from the first detector means S1 is also increased and so is F2 on the pilot valve 80. When the condition F2>F1 is reached, the spool 82 is moved to the left to introduce the pump pressure Pl into the head chamber 33 and release the hydraulic pressure from the rod chamber 34 into the oil sump 12. The piston 35 and the piston rod 36 of the servocylinder 30 are now moved to the left for progressively closing the clutch valves 7a, 7b thereby to enable the hydraulic pump 2 to start actuating the hydraulic motor 4.

Until the forces F1, F2 are balanced, the spool 82 is further moved to the left until finally the spool 82 is stopped at the lefthand limit position. The clutch valves 7a, 7b are fully closed to enable the hydraulic pump 2 to exert its full power to actuate the hydraulic motor 4. Since the forward/reverse mode selector device 20 is in the forward position at this time, the motor vehicle is started in the forward direction in response to rotation of the hydraulic motor 4.

At this time, the hydraulic pressure in the first oil passage 5h is higher than the hydraulic pressure in the second oil passage 5l. Therefore, the bypass passage 6b is closed by the check valve 8, and working oil only flows through the first clutch valve 7a. The opening of the bypass passages 6a, 6b with respect to the amount of operation of the clutch valve in the closing direction varies along e→d→b→a as indicated by the solid line in FIG. 6.

Upon a shift of the clutch valves 7a, 7b from the position of FIG. 2b to the position of FIG. 2c at this time, the directional control valve 49 is displaced to the righthand position to allow the throttle pressure Pt to act on the switching port 65a of the pilot valve 60, and F3 increases with the hydraulic force F32. The pilot valve 60 is arranged such that F3>F4 under this condition. The transmission ratio R is maintained at maximum, as during engine idling, as indicated by a curve A or a curve E in FIG. 5.

As the engine speed goes much higher, the governor pressure Pg is increased, and so is the force F4 on the pilot valve 60. When F3>F4 or F3=F4, the spool 63 is in the lefthand position or the neutral position, and the piston 54 and the piston rod 55 of the hydraulic cylinder 50 remain in the righthand limit position, with the transmission ratio R being maximum. However, the vehicle speed increases as indicated by a curve B or a curve F in FIG. 5 in response to an increase in the engine speed.

When the condition F3<F4 is reached as a result of a further increase in the engine speed, the spool 63 of the pilot valve 60 is moved to the left into the righthand position in which the pump pressure P1 is supplied to the head chamber 52 of the hydraulic cylinder 50 and the hydraulic pressure is released from the rod chamber 53 into the oil sump 12. Therefore, the piston 54 and the piston rod 55 is moved to the left to angularly move the swash plate 4c in a direction to reduce the angle θ, i.e., to reduce the transmission ratio for thereby increasing the vehicle speed. Inasmuch as the engine load is increased at this time to control an increase in the engine speed, the engine speed is maintained substantially at a constant level. This condition is indicated by a curve C or a curve G in FIG. 5. If the accelerator pedal is continuously depressed even after the transmission ratio R is reduced to its minimum value, the engine speed is increased until the engine power output and the engine load are brought into equilibrium, and so is the vehicle speed. The motor vehicle runs under a steady condition when the engine power output and the engine load are balanced. This is represented by a curve D or a curve H in FIG. 5.

Figure 5:
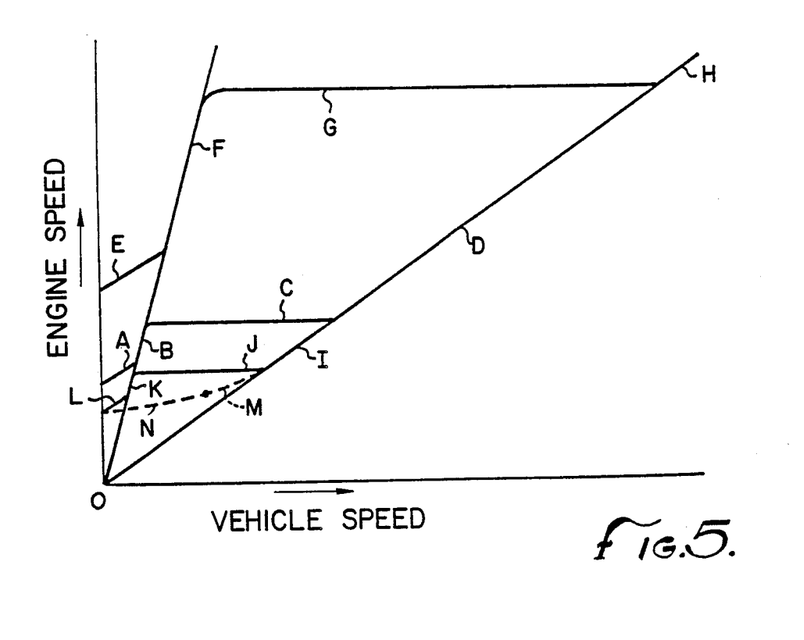
FIG. 5 is a graph showing speed change characteristics of a motor vehicle having the continuously variable transmission of the present invention.

The relationship between the engine speed and the vehicle speed from a start to a steady running condition when the vehicle is started slowly with the accelerator pedal depressed to a small depth is different from the relationship when the vehicle is started suddenly with the accelerator pedal depressed to a large depth. When the vehicle is started slowly, the relationship between the engine speed and the vehicle speed varies along the lines A→B→C→D→H as shown in FIG. 5. When the vehicle is started suddenly, the relationship varies along the lines E→F→G→H as shown in FIG. 5.

As is apparent from FIG. 5, the engine speed when the transmission is operated for a vehicle speed change is selected dependent on the amount of depression of the accelerator pedal, and the transmission is controlled so that the engine speed is made constant.

When releasing the accelerator pedal in order to stop the motor vehicle from a steady running condition, the throttle pressure Pt is lowered to a value corresponding to the throttle valve opening of zero. The condition F3<F4 is reached on the pilot valve 60, and the transmission ratio R is minimized. The hydraulic motor 4 is driven through the shaft 3 from the road wheels by the load inertia created by the vehicle speed, and the hydraulic pump 2 is rotated according to the pressure discharged by the motor 4. At the same time, the engine E is coupled to the hydraulic pump 2 and is rotated thereby, whereupon engine braking is applied to decelerate the motor vehicle.

The engine speed and the vehicle speed at this time vary along the lines H→I→I→J→K→L as shown in FIG. 5. The condition in which engine braking is exerted to decelerate the motor vehicle while the transmission ratio R remains minimum is indicated by H→D→I in FIG. 5. As the engine speed is lowered past the intersection of lines I and J, the condition F3>F4 is reached for the pilot valve 60, and the transmission ratio R is increased. At this time, the load on the engine braking is increased to prevent the engine speed from dropping, so that the engine speed becomes substantially constant as indicated by line J in FIG. 5. When the transmission ratio T reaches the maximum level, the engine speed drops with the vehicle speed as indicated by line K in FIG. 5. Upon a further reduction in the engine speed, the condition F1>F2 is reached on the pilot valve 80 and the clutch valves 7a, 7b are operated in the opening direction, and the engine speed and the vehicle speed are varied as represented by line L in FIG. 5. At this time, the bypass passages 6a, 6b are opened quickly along a→b→c→d→e including the dotted line b→c in FIG. 6 through the opening of the check valve 8. Therefore, no intensive engine braking is applied during the final stages of deceleration, and the vehicle can be stopped smoothly. The power transmission between the hydraulic pump 2 and the hydraulic motor 4 is now cut off to allow stopping of the motor vehicle. At this time, the engine E is idling, and the clutch valves 7a, 7b are operated from the position of FIG. 2c to the position of FIG. 2b, causing the directional control valve 49 to reach the lefthand position. Therefore, the pump pressure P1 is applied to the lefthand end of the spool 63 of the pilot valve 60 to keep the transmission ratio R at its maximum level.

It is assumed then that the motor vehicle is abruptly stopped from a running condition while the manual valve 48 is in the forward position F. In this case, the clutch valves 7a, 7b start opening before the operation of the transmission for a vehicle speed change is completed, because whereas the transmission is operated slowly to achieve a smooth vehicle speed change, clutch operation which is of high response is started earlier.

More specifically, as illustrated in FIG. 5, when the accelerator pedal is released and the motor vehicle is abruptly braked, the second detector means S2 produces a low throttle pressure Pt corresponding to the throttle valve opening of zero and the condition F3<F4 is reached on the pilot valve 60. The piston 54 of the hydraulic cylinder 50 is moved to the left to minimize the transmission ratio R. Then, engine braking is applied and an ordinary brake is operated to lower the vehicle speed quickly along H→D→I in FIG. 5. Upon this reduction in the engine speed, F3>F4 on the pilot valve 60, and the transmission ratio R is gradually increased with the reduction in the engine speed as indicated by the line M in FIG. 5. The engine speed is lowered without an increase in the load on the engine braking.

As the engine speed further drops, F1>F2 on the pilot valve 80, and the clutch valves 7a, 7b are operated in the opening direction. In response to such opening of the clutch valves 7a, 7b, the directional control valve 49 is shifted to the lefthand position, applying the pump pressure P to the lefthand end of the spool 63 of the pilot valve 60 to quickly move the spool 63 to the right. The piston 54 of the hydraulic cylinder 50 is also moved to the right into the righthand limit position. When the motor vehicle is stopped, the transmission ratio R is quickly increased to the maximum value. This is indicated by the line N in FIG. 5. At this time, since the opening of the bypass passages 6a, 6b with respect to the amount of opening operation of the clutch valves 7a, 7b is sharply increased as indicated by a→b→c→d→e along the dashed inclined line in FIG. 6, no intensive engine braking is applied even if the transmission ratio R is increased as described above, and hence the motor vehicle can smoothly be stopped.

If the manual valve 48 is shifted from the forward position F to the neutral position N after the motor vehicle is stopped, the hydraulic pressure in the chambers 42, 43 of the hydraulic cylinder 40 is released, and the piston 44 remains biased into the lefthand limit position under the resiliency of the spring 46. Therefore, the forward/reverse mode selector device 20 is continuously held in the forward position F. Because the hydraulic pressure in the oil passage 101 is zero, the clutch valves 7a, 7b are fully open.

When the engine is idling while the manual valve 48 is in the forward position, the transmission ratio R is maximum. If the manual valve 48 is shifted into the neutral position N in this condition, the transmission ratio R remains maximum. Therefore, when the manual valve 48 is shifted from the neutral position N to the forward position F to get the motor vehicle started, a maximum transmission ratio required to start the motor vehicle can immediately be obtained, and the motor vehicle can smoothly be started.

By shifting the manual valve 48 from the neutral position N to the reverse position R while the motor vehicle is at rest, the manual valve 48 provides communication between the oil passages 110, 101, the oil passages 111, 102, and the oil passage 103 and the oil release passage 112. The head chamber 42 of the hydraulic cylinder 40 is supplied with the pump pressure Pl, and the hydraulic pressure in the rod chamber 43 is released. Thus, the piston 44 is moved to the right, and the sleeve 27 of the forward/reverse mode selector device 20 is moved to the right out of engagement with the forward clutch gear 23a into engagement with the reverse clutch gear 25a.

Since the oil passage 101 is supplied with the pump pressure Pl, the clutch valves 7a, 7b are operated until the throttle pressure Pt and the governor pressure Pg are balanced. When the engine is idling, the partly engaged clutch condition is achieved. At this time, the hydraulic cylinder 50 operates in the same manner as when the manual valve 48 is shifted from the neutral position N to the forward position F, and the transmission ratio R becomes maximum.

In order to start the motor vehicle backwards, the throttle valve opening/closing device 15 is operated to open the throttle valve. As with the operation to move the motor vehicle forwardly as described above, the clutch valves 7a, 7b are gradually closed (the clutch valve 7b is effectively closed from the outset because of the check valve 8) to start actuating the hydraulic motor 4 to start the motor vehicle backwards. The pilot valve 60 operates in the same manner for effecting the same transmission control as when the motor vehicle is moved forwardly.

When the motor vehicle is stopped while the manual valve 48 is in the reverse position R, the forward/reverse mode selector device 20 is kept in the reverse position R whereas the clutch valves 7a, 7b and the swash plate 4c operate in the same way as when the motor vehicle is stopped while running forwardly. When the manual valve 48 is shifted from the reverse position R to the neutral position N after the motor vehicle is stopped, both of the chambers 42, 43 of the hydraulic cylinder 40 are brought into communication with the oil sump 12. The piston 44 is therefore moved from the righthand limit position to the lefthand limit position, so that the forward/reverse mode selector device 20 is released from the reverse position. At this time, since the hydraulic pressure in the oil passage 101 is zero and the clutch valves 7a, 7b are fully open, the clutch gear 25a and the sleeve 27 can smoothly disengage from each other. The transmission ratio R is maximum when the manual valve 48 is in the reverse position R and the engine is idling as when the manual valve 48 is shifted from the forward position F to the neutral position N.

According to another embodiment of the present invention, the control unit CU may be constructed of a microcomputer or the like. More specifically, the engine speed, the throttle valve opening, the shifted position of the manual valve, and the selected position of the forward/reverse mode selector device 20 are electrically detected, and the detected data items are applied to a microcomputer which is programmed to process them to produce the same mechanical movements as described above in the aforesaid embodiment by operating a driver in place of the hydraulic cylinder 50. The hydraulic cylinder 50 which is a hydraulic actuator may be replaced with an electric actuator such as a stepping motor, a linear stepping motor, a DC motor, or an AC motor dependent on the construction of the control unit CU. The pilot valve 60 and the manual valve 48 may comprise an electro-hydraulic servovalve or a solenoid-operated proportional pressure control valve.

The present invention is not limited to the hydraulically operated, continuously variable transmission for motor vehicles comprising the fixed displacement hydraulic sump 2 and the variable displacement hydraulic motor 4. The principles of the present invention are applicable to a transmission comprising a variable displacement hydraulic pump and a fixed displacement hydraulic motor, or a transmission comprising a variable displacement hydraulic pump and a variable displacement hydraulic motor.

While the forward/reverse mode selector device 20 is of the dog clutch type in the foregoing embodiment, it may comprise a wet-type clutch or the like. While the pressure P discharged from the charging pump 10 is employed as the working pressure for operating the hydraulic cylinder 50 in the above embodiment, a high hydraulic pressure in the closed hydraulic circuit 5 may be utilized as the working pressure.

The detection of the throttle valve opening or the accelerator pedal depression as an indication of the driver's intention of acceleration and deceleration may be replaced with the detection of the vacuum developed in the intake pipe of the engine, and the amount of fuel supplied to the engine, and the engine torque may be detected instead of the engine speed as an indication of the engine power output.

With the present invention, as described above, since the opening of the bypass passages controlled by the clutch valves disclosed in the bypass passages which are connected between the two oil passages of the closed hydraulic circuit is quickly increased when the transmission is driven by driving forces from the road wheels at the time of decelerating the motor vehicle, intensive engine braking is prevented from being applied to the motor vehicle even if the transmission ratio is abruptly increased during stopping of the motor vehicle by idle inertia-dependent movement. Therefore, the vehicle can be stopped smoothly with an improved feeling to the driver over previous systems.

The invention claimed is:

1. A control device for a continuously variable vehicle transmission having a closed hydraulic circuit with two passages disposed between a hydraulic pump and a hydraulic motor, at least one of said hydraulic pump and said hydraulic motor being of the variable displacement type, said hydraulic pump being connected to an engine and said hydraulic motor being driven by a hydraulic pressure from said hydraulic pump for driving road wheels, the improvement comprising, bypass passage means connected between said two passages of said closed hydraulic circuit, clutch valve means disposed in said bypass passage means for adjusting the opening of said bypass passage means, and means for operating said clutch valve means, the arrangement being such that means for opening said bypass passage means when said continuously variable transmission receives driving forces from the road wheels opens the bypass passage means to a greater opening than the opening of said bypass passage means when said continuously variable transmission is driven by the engine.

2. The control device of claim 1 wherein said bypass passage means includes two separate bypass passages with a clutch valve means in each said bypass passage.

3. A control device for a continuously variable vehicle transmission having a closed hydraulic circuit with two passages disposed between a hydraulic pump and a hydraulic motor, at least one of said hydraulic pump and said hydraulic motor being of the variable displacement type, said hydraulic pump being connected to an engine and said hydraulic motor being driven by a hydraulic pressure from said hydraulic pump for driving road wheels, the improvement comprising, bypass passage means connected between said two passages of said closed hydraulic circuit, clutch valve means disposed in said bypass passage means for adjusting the opening of said bypass passage means, and means for operating said clutch valve means, the arrangement being such that means for opening said bypass passage means when said continuously variable transmission receives driving forces from the road wheels opens the bypass passage means to a greater opening than the opening of said bypass passage means when said continuously variable transmission is driven by the engine, wherein said bypass means includes two separate bypass passages with a clutch valve means in each said bypass passage, and the clutch valve means in one of said two separate bypass passages includes a check valve for only allowing hydraulic flow through that one bypass passage when the transmission receives the driving forces from the road wheels.

4. A control device for a continuously variable vehicle transmission having a closed hydraulic circuit with two passages disposed between a hydraulic pump and a hydraulic motor, at least one of said hydraulic pump and said hydraulic motor being of the variable displacement type, said hydraulic pump being connected to an engine and said hydraulic motor being driven by a hydraulic pressure from said hydraulic pump for driving road wheels, the improvement comprising, bypass passage means connected between said two passages of said closed hydraulic circuit, clutch valve means disposed in said bypass passage means for adjusting the opening of said bypass passage means, and means for operating said clutch valve means, the arrangement being such that means for opening said bypass passage means when said continuously variable transmission receives driving forces from the road wheels opens the bypass passage means to a greater opening than the opening of said bypass passage means when said continuously variable transmission is driven by the engine, wherein said bypass passage means includes two separate bypass passages with a clutch valve means in each said bypass passage, and said clutch valve means is comprised of a single valve member with two separate holes in communication with said two separate bypass passages for simultaneously controlling flow through said two separate bypass passages.

5. The control device of claim 1 wherein means are provided for operating said clutch valve means to rapidly increase the opening of the bypass passage means upon rapid vehicle deceleration.

6. A control device for a continuously variable vehicle transmission having a closed hydraulic circuit with two passages disposed between a hydraulic pump and a hydraulic motor, at least one of said hydraulic pump and said hydraulic motor being of the variable displacement type, said hydraulic pump being connected to an engine and said hydraulic motor being driven by a hydraulic pressure from said hydraulic pump for driving road wheels, the improvement comprising, bypass passage means connected between said two passages of said closed hydraulic circuit, clutch valve means disposed in said bypass passage means for adjusting the opening of said bypass passage means, and means for operating said clutch valve means, the arrangement being such that means for opening said bypass passage means when said continuously variable transmission receives driving forces from the road wheels opens the bypass passage means to a greater opening than the opening of said bypass passage means when said continuously variable transmission is driven by the engine, wherein means are provided for operating said clutch valve means to rapidly increase the opening of the bypass passage means upon rapid vehicle deceleration, and means are provided for increasing the ratio of the transmission during said rapid vehicle deceleration.

7. A control device for a continuously variable vehicle transmission having a hydraulic pump and a hydraulic motor with a closed hydraulic circuit wherein the pump has an output connected to an input on the motor and the motor has an output connected to an input on the pump, comprising, bypass means for connecting the pump output and input and motor output and input, and means for controlling the flow through said bypass means to allow greater flow during deceleration of the vehicle than during acceleration of the vehicle.

8. A control device for a continuously variable vehicle transmission having a hydraulic pump and a hydraulic motor with a closed hydraulic circuit wherein the pump has an output connected to an input on the motor and the motor has an output connected to an input on the pump, comprising, bypass means for connecting the pump output and input and motor output and input, and means for controlling the flow through said bypass means to allow greater flow during deceleration of the vehicle than during acceleration of the vehicle, wherein said bypass means includes at least two separate flow paths and one said flow path includes means for allowing flow from the motor output to the motor input and restricting flow from the pump output to the pump input.

9. A control device for a continuously variable transmission in a vehicle, said transmission having a hydraulic pump and a hydraulic motor interconnected by a closed hydraulic circuit, said closed hydraulic circuit having a first passage and a second passage between said hydraulic pump and said hydraulic motor, said hydraulic pump being connected to an engine, said hydraulic motor being driven by a hydraulic pressure from said hydraulic pump for driving road wheels of said vehicle, comprising, bypass passage means disposed between said first passage and said second passage for selectively bypassing said closed hydraulic circuit by interconnecting said first and second passages, first valve means in said bypass passage means for adjusting an opening of said bypass passage means, and means responsive to an engine braking condition of said vehicle for further adjusting said opening of said bypass passage means.

10. A control device for a continuously variable transmission according to claim 9, wherein during said engine braking condition said means responsive increases said opening over the opening set by said first valve means.

11. A control device for a continuously variable transmission according to claim 9, wherein said opening is increased during said engine braking condition.

12. A control device for a continuously variable transmission according to claim 9, wherein means are provided to rapidly increase the opening in said bypass passage means upon rapid vehicle deceleration.

13. A control device for a continuously variable transmission in a vehicle, said transmission having a hydraulic pump and a hydraulic motor interconnected through a closed hydraulic circuit, said hydraulic circuit having a first passage connecting said hydraulic pump to said hydraulic motor and a second passage connecting said hydraulic pump to said hydraulic motor, and bypass passage means for selectively connecting said first and second passages, comprising, a first valve means for varying an opening in said bypass passage means and a second valve means responsive to an engine braking condition for varying said opening in response to said engine braking condition.

14. A control device for a continuously variable transmission according to claim 13, wherein during a non-engine-braking condition said opening is determined by a setting of said first valve means, and during said engine braking condition, for the same setting of said first valve means as during said non-braking condition, said second valve means operates to increase said opening.

15. A control device for a continuously variable transmission according to claim 13, wherein for a given setting of said first valve means, said opening is greater during said engine braking condition than during an acceleration condition of said vehicle.

* * * * *